US010449813B2

(12) United States Patent
Kang et al.

(10) Patent No.: US 10,449,813 B2
(45) Date of Patent: Oct. 22, 2019

(54) AIR MAINTENANCE TIRE

(71) Applicant: The Goodyear Tire & Rubber Company, Akron, OH (US)

(72) Inventors: Jungmee Kang, Macedonia, OH (US); Byoung Jo Lee, Copley, OH (US); Daniel Vojtko, Akron, OH (US); Dinesh Chandra, Hudson, OH (US); Betul Buehler, Akron, OH (US); Benjamin Isaiah Garn, Norton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 74 days.

(21) Appl. No.: 15/416,127

(22) Filed: Jan. 26, 2017

(65) Prior Publication Data

US 2017/0217262 A1    Aug. 3, 2017

Related U.S. Application Data

(60) Provisional application No. 62/422,822, filed on Nov. 16, 2016, provisional application No. 62/288,643, filed on Jan. 29, 2016.

(51) Int. Cl.
*B60C 23/12*    (2006.01)
*B60C 1/00*    (2006.01)
(Continued)

(52) U.S. Cl.
CPC .............. *B60C 23/12* (2013.01); *B60C 1/00* (2013.01); *C08L 7/00* (2013.01); *C08L 9/00* (2013.01); *B60C 13/02* (2013.01)

(58) Field of Classification Search
CPC .................................................... B60C 23/12
See application file for complete search history.

(56) References Cited

U.S. PATENT DOCUMENTS 5,451,646 A    9/1995  Castner
7,694,708 B2   4/2010  Agostini et al.
(Continued)

FOREIGN PATENT DOCUMENTS

EP    1911606 A1    4/2008
EP    1911608 A1    4/2008
(Continued)

OTHER PUBLICATIONS

European Search Report dated Apr. 28, 2017 for Application Serial No. EP17153432.

*Primary Examiner* — Megan McCulley
(74) *Attorney, Agent, or Firm* — John D. DeLong

(57) ABSTRACT

A self-inflating tire assembly includes an air tube mounted within a tire sidewall or chafer groove. The air tube is in contacting engagement with opposite angled groove surfaces surrounding the air tube. A segment of the air tube is flattened from an expanded diameter to a flat diameter by bending and compression of the groove in a rolling tire footprint to force air evacuated from the flattened segment along a tube air passageway. A coverstrip overlays and seals the groove and provides an abrasion resistant surface on the exterior of the tire. The coverstrip is made from a vulcanizable rubber composition comprising from 50 to 80 phr of a polybutadiene, from 50 to 20 phr of natural rubber, and from 0.1 to 5 phr of a vulcanization modifier.

1 Claim, 5 Drawing Sheets

(51) Int. Cl.
    *C08L 7/00*        (2006.01)
    *C08L 9/00*        (2006.01)
    *B60C 13/02*     (2006.01)

(56) References Cited

U.S. PATENT DOCUMENTS

| | | |
|---|---|---|
| 7,789,119 B2 | 9/2010 | Agostini et al. |
| 8,042,586 B2 | 10/2011 | Losey et al. |
| 9,233,583 B2 | 1/2016 | Lin et al. |
| 2008/0083479 A1 | 4/2008 | Agostini et al. |
| 2008/0178981 A1 | 7/2008 | Agostini et al. |
| 2013/0061996 A1 | 4/2013 | Delgado |
| 2013/0133802 A1 | 5/2013 | Delgado |
| 2014/0261943 A1 | 9/2014 | Welter et al. |
| 2015/0165842 A1 | 6/2015 | Welter |
| 2015/0203662 A1* | 7/2015 | Yan .................. C08C 19/44 524/575 |
| 2015/0360524 A1 | 12/2015 | Gobinath et al. |
| 2018/0079891 A1* | 3/2018 | Yan ................ C08K 5/5419 |
| 2018/0105626 A1* | 4/2018 | Fontaine .............. C08F 210/18 |
| 2018/0134080 A1* | 5/2018 | Ikeda ................. C08F 136/06 |
| 2018/0134086 A1* | 5/2018 | Schweitzer .......... B60C 1/0016 |
| 2018/0162959 A1* | 6/2018 | Choi ................. C08F 36/04 |

FOREIGN PATENT DOCUMENTS

| | | | |
|---|---|---|---|
| EP | 2777959 | A1 | 9/2014 |
| EP | 2957439 | A1 | 12/2015 |

\* cited by examiner

AIR MAINTENANCE TIRE

This invention was made with Government support under contract number DEEE0005447 awarded by DOE. The Government has certain rights in the invention.

FIELD OF THE INVENTION

The invention relates generally to air maintenance tires and, more specifically, to a tire assembly incorporating an air pumping mechanism into a tire for maintaining tire air pressure.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance Tire Pressure Monitoring Systems have been proposed to warn drivers when tire pressure is significantly low. Such systems, however, remain dependent upon the driver taking remedial action when warned to re-inflate a tire to recommended pressure. It is a desirable, therefore, to incorporate an air maintenance feature within a tire that will self-maintain the tire air pressure in order to compensate for any reduction in tire pressure over time without a need for driver intervention.

U.S. Pat. No. 8,042,586 discloses a self-inflating tire assembly that includes an air tube mounted within a tire sidewall or chafer groove. The air tube is in contacting engagement with opposite angled groove surfaces surrounding the air tube. A segment of the air tube is flattened from an expanded diameter to a flat diameter by bending and compression of the groove in a rolling tire footprint to force air evacuated from the flattened segment along a tube air passageway. The sidewall groove extends into an annular, axially extending, sidewall surface such as an axially oriented surface of a tire chafer protrusion located in non-contacting relationship with the rim.

SUMMARY OF THE INVENTION

There is disclosed a self-inflating tire assembly includes an air tube mounted within a tire sidewall or chafer groove. The air tube is in contacting engagement with opposite angled groove surfaces surrounding the air tube. A segment of the air tube is flattened from an expanded diameter to a flat diameter by bending and compression of the groove in a rolling tire footprint to force air evacuated from the flattened segment along a tube air passageway. A coverstrip overlays and seals the groove and provides an abrasion resistant surface on the exterior of the tire. The coverstrip is made from a vulcanizable rubber composition comprising from 50 to 80 phr of a polybutadiene, from 50 to 20 phr of natural rubber, and from 0.1 to 5 phr of a vulcanization modifier.

BRIEF DESCRIPTION OF THE DRAWINGS

The invention will be described by way of example and with reference to the accompanying drawings in which.

DETAILED DESCRIPTION OF THE INVENTION

The present invention is directed to a self-inflating tire assembly includes an air tube mounted within a tire sidewall or chafer groove. The air tube is in contacting engagement with opposite angled groove surfaces surrounding the air tube. A segment of the air tube is flattened from an expanded diameter to a flat diameter by bending and compression of the groove in a rolling tire footprint to force air evacuated from the flattened segment along a tube air passageway. A coverstrip overlays and seals the groove and provides an abrasion resistant surface on the exterior of the tire. The coverstrip is made from a vulcanizable rubber composition comprising from 50 to 80 phr of a polybutadiene, from 50 to 20 phr of natural rubber, and from 0.1 to 5 phr of a vulcanization modifier.

Figure 1:
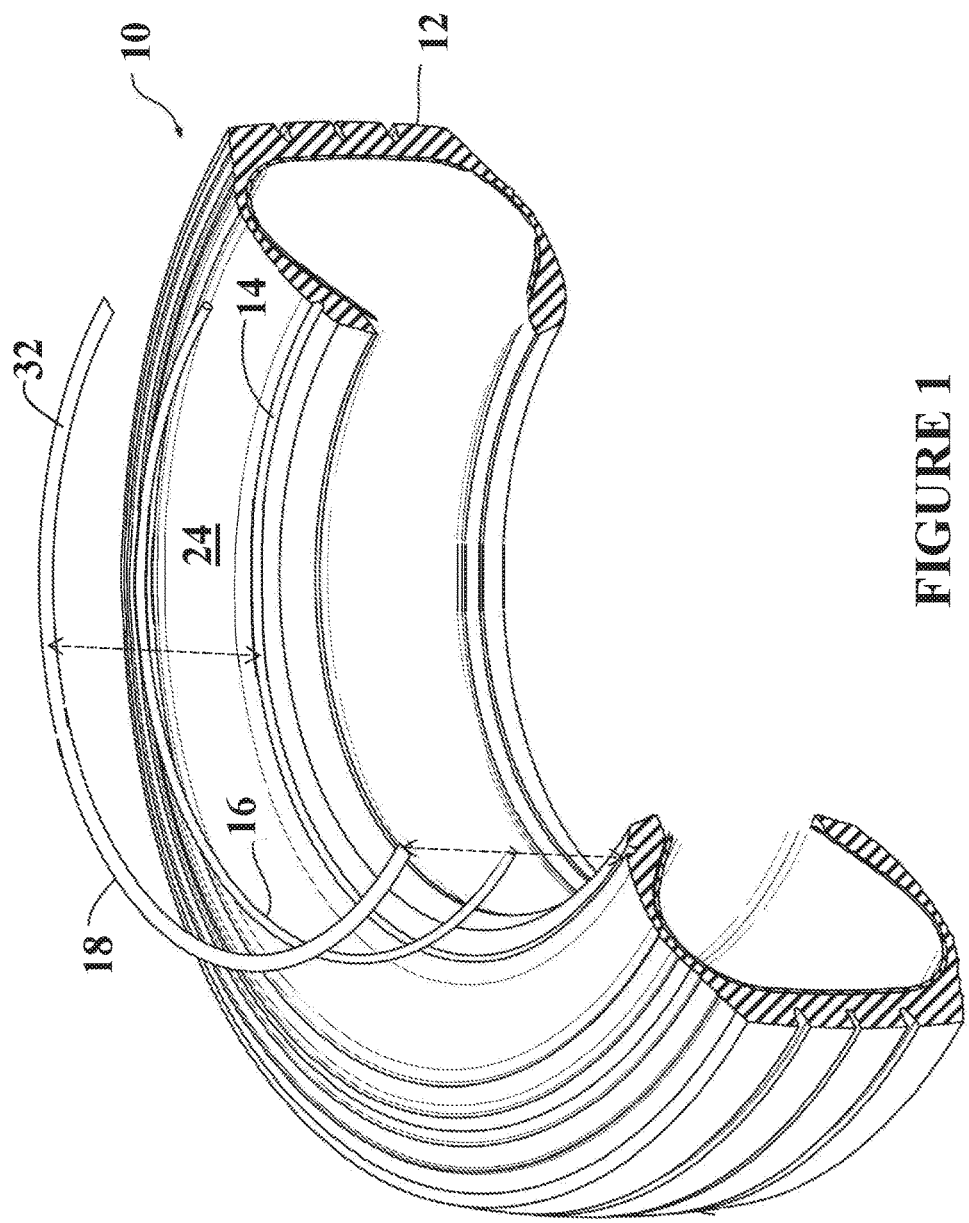
FIG. 1 is an expanded view of a tire assembly including an air tube, tire and coverstrip pursuant to the invention.

As shown in FIG. 1, the tire assembly 10 includes a tire 12 with a groove 14 that is preferably an annular groove. The groove is located in the sidewall region 24 of the tire 12, typically in the chafer area near the bead region. The groove 14 is adapted to receive self-inflating tire components, such as pump tubing 16 installed in the groove 14 and operable to pump air. The pump configuration may vary, and for example may be a 360 degree pump, or two 180 degree pumps, or a single 180 degree pump. The tire components may further include a valve or regulator mechanism and a filter mechanism, and also additional components such as passage tubes which communicate air between the valve and filter components (not shown). A coverstrip 18 overlays groove 14 and inserted tube 16. The coverstrip 18 seals groove 14 and provides an abrasion resistant outer surface 32 on the exterior of tire 12. The tube 16 and coverstrip 18 may be installed and cured with tire 12 using a method as disclosed in U.S. Pat. No. 9,233,583.

Figure 2:
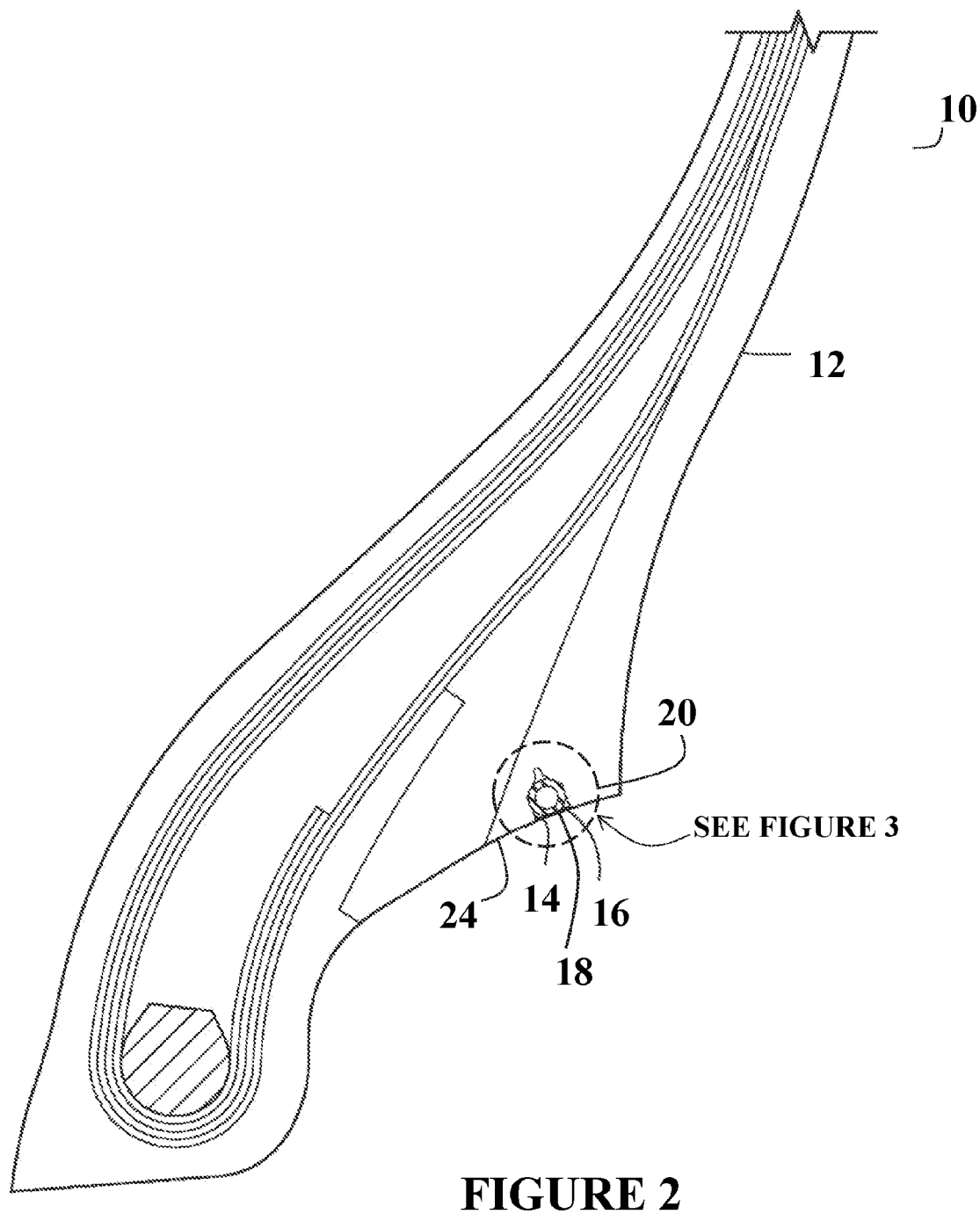
FIG. 2 is a section view of the air tube within a groove in a tire.
Figure 3:
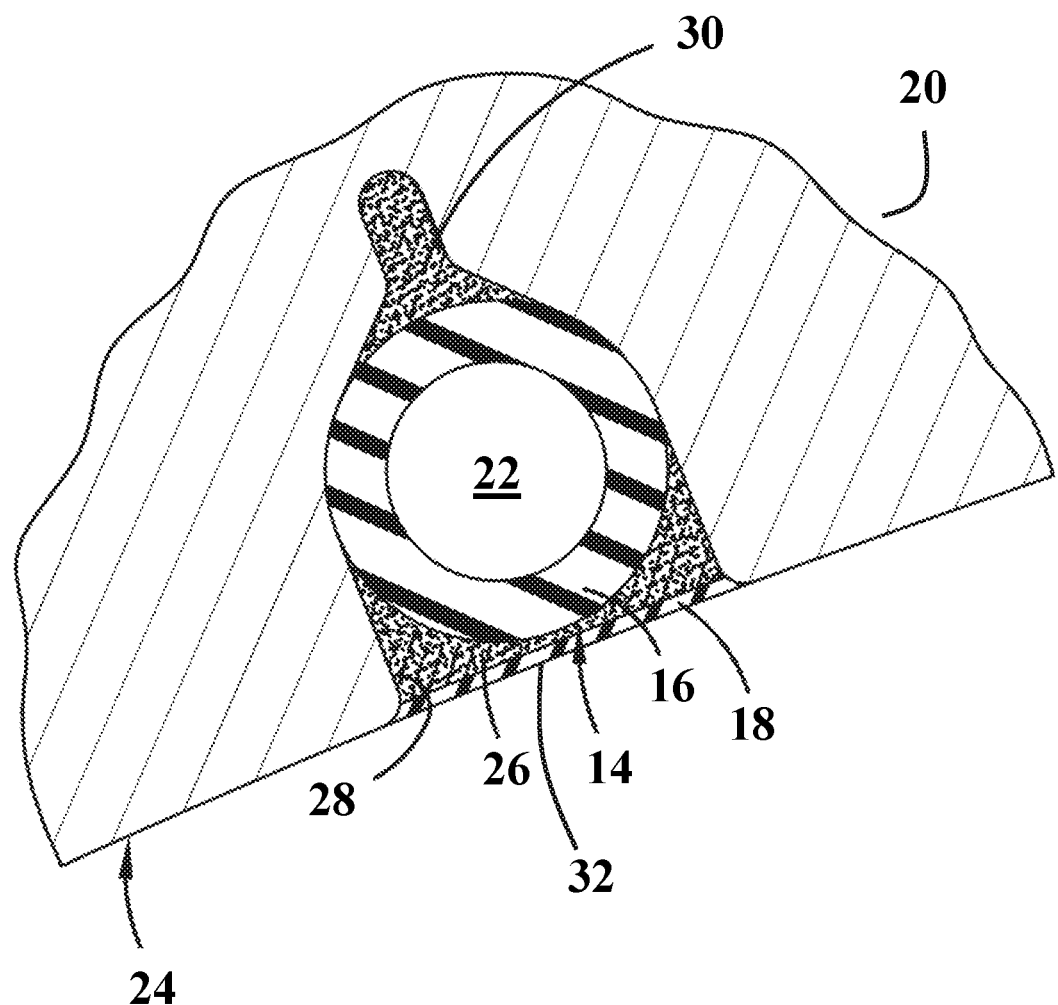
FIG. 3 is an enlarged section view of the air tube within the groove of FIG. 2, showing the coverstrip in detail.

As seen in FIGS. 2 and 3, the peristaltic pump assembly 20 includes tube 16 that encloses an annular passageway 22. The tube 16 is formed of a resilient, flexible material such as plastic or rubber compounds that are capable of withstanding repeated deformation cycles. So constructed, the tube 16 may deform within the tire 12 into a flattened condition subject to external force and, upon removal of such force, return to an original sectional configuration. In the embodiment shown, the cross-section of the tube in an unstressed state is generally circular but other alternative tube geometries may be employed if desired. The tube is of a diameter sufficient to operatively pass a requisite volume of air sufficient for the purpose of pumping air into the tire cavity to maintain the tire 12 at a preferred inflation pressure.

The tube 16 mounts closely within the groove 14 in the tire and sequentially flattens as the tire 12 rotates. The segment by segment flattening of the tube 16 as the tire 12 rotates operates to pump air along the air passageway 22; air which is then directed into the tire cavity to maintain air pressure. A peristaltic pumping system employing a tube within a sidewall or chafer groove is shown in issued U.S. Pat. No. 8,042,586, incorporated herein by reference in its entirety.

FIG. 2 shows a preferred location for the air tube assembly 20. The tube 16 is located within the groove 14 in the sidewall 24 of the tire 12. In another embodiment, the groove 14 is located in a chafer. The tube 16 is closed by compression strain bending the sidewall groove 14 within a rolling tire footprint. The location of the tube 16 in the sidewall 24 affords the user freedom of placement and avoids contact between the tube 16 and a rim flange (not shown). The higher placement of the tube 16 in the sidewall groove 14 uses the deformation of the sidewall as it passes through the tire footprint to close the tube and provide the pumping action rather than pinching the tube.

FIG. 3 shows a magnified view of the circled pump assembly 20 of FIG. 2. Tube 16 is disposed within groove 14 and is surrounded by a rubber adhesive 30. Tube 16 is subject to flattening by compression from groove walls 28 while the tire rotates through a footprint. Coverstrip 18 overlays groove 14 and seals groove opening 26, and provides an abrasion resistant surface 32 on the tire exterior.

In another embodiment, an adhesive strip is disposed between the coverstrip and tube, to provide adhesion between the coverstrip and the tube and sidewall of the tire. The adhesive strip is made from a vulcanizable rubber composition comprising from 50 to 80 phr of a second polybutadiene, from 50 to 20 phr of natural rubber, and from 0.1 to 0.2 of the vulcanization modifier.

Figure 4:
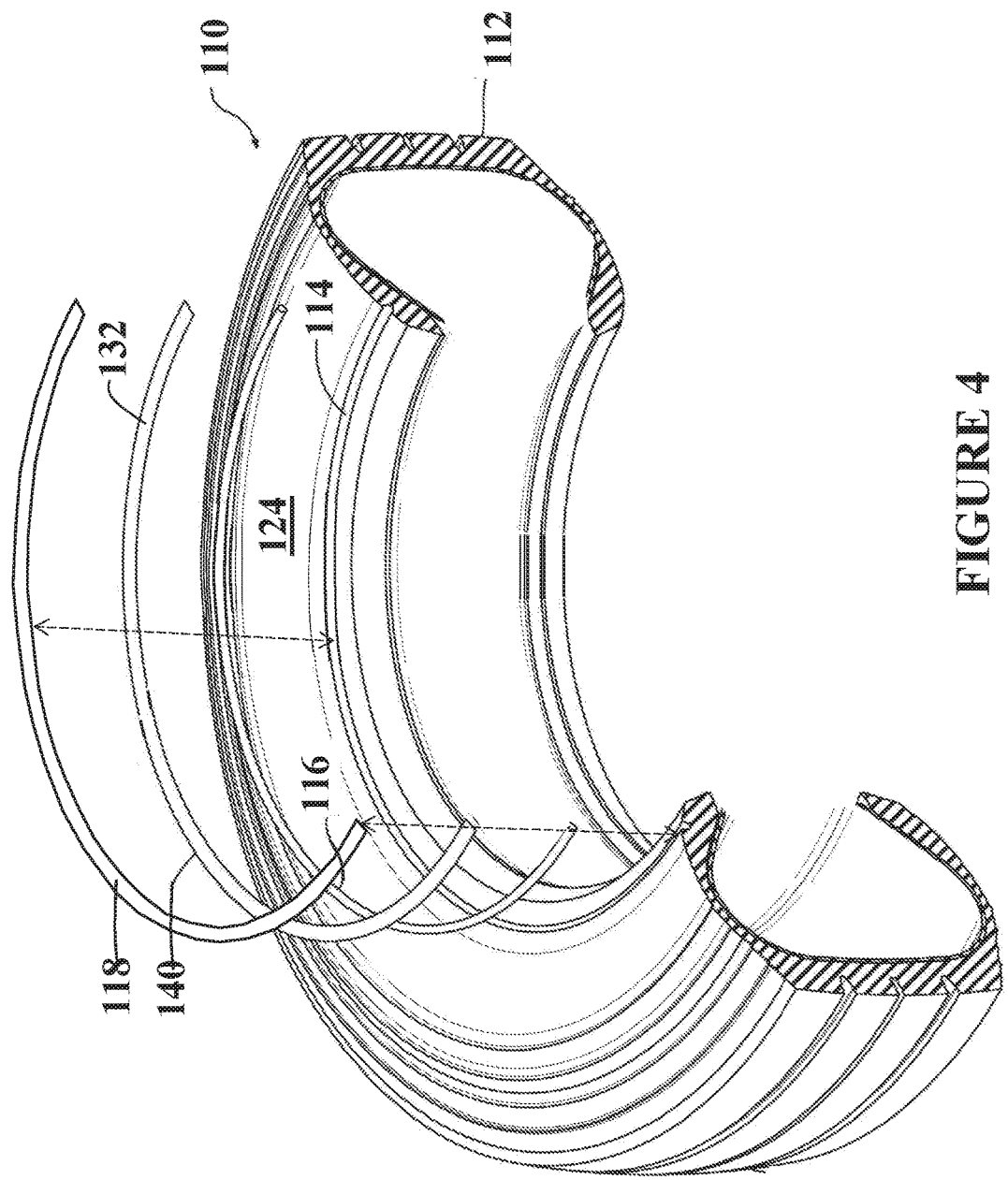
FIG. 4 is an expanded view of a tire assembly including an air tube, tire and coverstrip pursuant to another embodiment of the invention.

As shown in FIG. 4, the tire assembly 110 includes a tire 112 with a groove 114 that is preferably an annular groove. The groove is located in the sidewall region 124 of the tire 112, typically in the chafer area near the bead region. The groove 114 is adapted to receive self-inflating tire components, such as pump tubing 16 installed in the groove 114 and operable to pump air. The pump configuration may vary, and for example may be a 360 degree pump, or two 180 degree pumps, or a single 180 degree pump. The tire components may further include a valve or regulator mechanism and a filter mechanism, and also additional components such as passage tubes which communicate air between the valve and filter components (not shown). A coverstrip 118 overlays groove 114 and inserted tube 116. Adhesive strip 140 is disposed between tube 16 and coverstrip 118 and provides adhesion between coverstrip 118 and tube 116 and sidewall 124. The coverstrip 118 seals groove 114 and provides an abrasion resistant outer surface 32 on the exterior of tire 112. The tube 116, adhesive strip 140 and coverstrip 118 may be installed and cured with tire 112 using a method as disclosed in U.S. Pat. No. 9,233,583.

The rubber composition of the coverstrip includes a specialized cis 1,4-polybutadiene elastomer having a microstructure comprised of about 96 to about 99 percent cis 1,4-isomeric units, about 0.1 to about 1 percent trans 1,4-isomeric units and from about 1 to about 3 percent vinyl 1,2-isomeric units; a number average molecular weight (Mn) in a range of from about 75,000 to about 150,000 (relatively low Mn for a cis 1,4-polybutadiene elastomer) and a heterogeneity index (Mw/Mn) in a range of from about 3/1 to about 5/1 (a relatively high heterogeneity index range illustrating a significant disparity between its weight average and number average molecular weights).

The specialized cis 1,4-polybutadiene elastomer may be prepared, for example, by organic solvent solution polymerization of 1,3-butadiene monomer in the presence of a catalyst comprised of an organonickel or organocobalt compound, an organoaluminum compound, a fluorine-containing compound, and a para styrenated diphenylamine which is exemplified in U.S. Pat. No. 5,451,646. Such catalyst components may be comprised of nickel octoate, triisobutylaluminum, hydrogen fluoride and para styrenated diphenylamine. It is considered herein that such specialized cis 1,4-polybutadiene may be suitably prepared by such polymerization without undue experimentation.

The relatively broad heterogeneity index (Mw/Mn ratio range of 3/1 to 5/1) of the specialized cis 1,4-polybutadiene elastomer is considered herein to be significant to promote improved processing of the unvulcanized rubber composition of which a major, rather than a minor, fraction of its rubber component is the specialized cis 1,4-polybutadiene rubber, in a sense of promoting a relatively smooth surfaced extrudate, as compared to similar and more typical cis 1,4-polybutadiene elastomers rubber having the aforesaid significantly higher molecular weight and significantly lower heterogeneity index in a range of from about 1.5/1 to about 2.5/1. The specialized cis 1,4-polybutadiene elastomer is also considered herein to be unique in that it is configured with a level, or degree, of branching.

In one embodiment, the rubber composition includes from about 50 to about 80 phr of the specialized polybutadiene rubber. Suitable specialized polybutadiene rubber is available commercially, such as Budene® 1280 from Goodyear and the like.

The rubber composition further includes a natural rubber. In one embodiment, the rubber composition includes from 20 to 50 phr of natural rubber.

The rubber composition of the adhesive strip includes a conventional, second cis-1,4 polybutadiene having a heterogeneity index in a range of from about 1.5/1 to about 2.5/1.

In one embodiment, the rubber composition of the adhesive strip includes from about 50 to about 80 phr of the second cis-1,4 polybutadiene rubber. Suitable second cis 1,4 polybutadiene rubber is available commercially, such as Budene® 1207 and 1208 from Goodyear and the like.

The term "phr" as used herein, and according to conventional practice, refers to "parts by weight of a respective material per 100 parts by weight of rubber, or elastomer."

The rubber compositions of the coverstrip and adhesive strip may also include up to 20 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber compositions of the coverstrip and adhesive strip includes carbon black. Carbon blacks is used as in an amount ranging from 40 to 100 phr. In another embodiment, from 50 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 $cm^3$/100 g.

The rubber compositions may optionally include from up to about 20 phr of silica. Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

If silica is included, the rubber compositions may also contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

In order to obtain an initial slow cure rate to allow flow of the coverstrip and adhesive strip compound into the groove, the rubber composition includes a vulcanization modifier. In one embodiment, the vulcanization modifier includes nitroso compounds, phthalimides, anhydrides and acids. In one embodiment, the vulcanization modifier includes N-nitroso diphenylamine, polynitroso-2,2,4-trimethyl-1,2-dihydroquinoline, N-cyclohexyl thiophthalimide, phthalic anhydride, salicylic acid, and benzoic acid.

In one embodiment, the rubber composition of the coverstrip includes from about 0.1 to about 5 parts by weight, per 100 parts by weight of elastomer (phr), of the vulcanization modifier. In another embodiment, the second rubber composition may comprise from about 0.3 to about 2 phr of vulcanization modifier.

In one embodiment, the rubber composition of the adhesive strip includes from about 0.1 to about 0.2 parts by weight, per 100 parts by weight of elastomer (phr), of the vulcanization modifier.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

Example 1

In this example, the effect of a rubber composition on the performance of a coverstrip compound is illustrated. Four rubber compounds were mixed and cured and their performance compared. Sample 1 included a conventional cis 1,4 polybutadiene (Budene 1207 from the Goodyear Tire & Rubber Company), natural rubber and no vulcanization modifier. Samples 2 and 4 included a polybutadiene according to the invention (Budene 1280 from the Goodyear Tire & Rubber Company), a natural rubber, and a vulcanization modifier. Sample 3 included a polybutadiene according to the present invention (Budene 1280), natural rubber, but no vulcanization modifier. Each of the compounds further included carbon black. The compounds also included processing aids and curatives as are known in the art.

Figure 5:
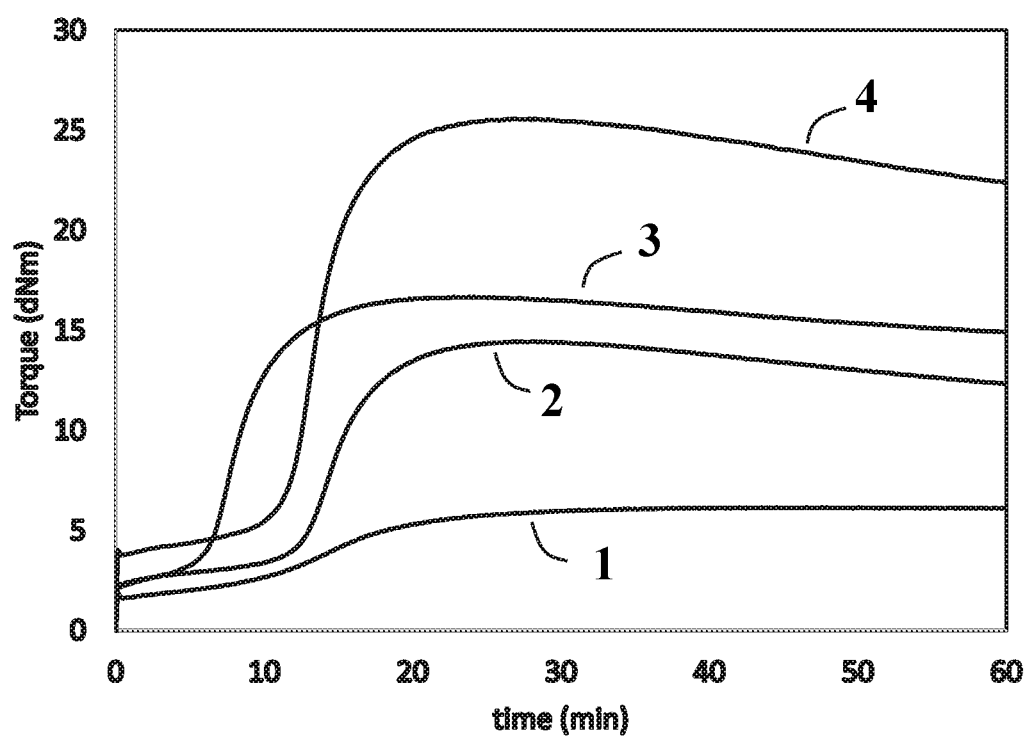
FIG. 5 is a graph showing the cure profiles for several coverstrip compounds.

FIG. 5 shows the cure profiles for each of the four compounds. As seen in FIG. 5, Samples 2 and 4 which included the vulcanization modifier show relatively slow cure at the beginning, in contrast to the cure of Sample 3 which did not include vulcanization modifier. The slower cure of the compounds of Samples 2 and 4 according to the invention allow flow of the coverstrip compound into the groove before complete cure.

Abrasion resistance was measured for Samples 1, 2 and 4. The abrasion loss for Samples 2 (0.038 g) and 4 (0.041 g) was about 70 percent less than for Sample 1 (0.14 g), indicating a superior abrasion resistance for the compounds of the present invention.

Example 2

In this example, the effect of a rubber composition on the adhesion of a strip compound is illustrated. Two rubber compounds were mixed and cured and their performance compared. Sample 5 included a conventional cis 1,4 polybutadiene (Budene 1207 from the Goodyear Tire & Rubber Company), natural rubber and no vulcanization modifier. Sample 6 included a polybutadiene according to the invention (Budene 1280 from the Goodyear Tire & Rubber Company), a natural rubber, and a vulcanization modifier. Each of the compounds further included carbon black. The compounds also included processing aids and curatives as are known in the art.

Table 1 shows the adhesion of Samples 5 and 6 to sidewall and chafer compounds. Adhesion testing was done to determine the interfacial adhesion between the rubber formulations that were prepared after being precured for 25 minutes at 170° C. for sidewall or 32 minutes at 150° C. for chafer and then curing together (Sample rubber and substrate rubber) for 30 minutes at 150° C. The interfacial adhesion between rubbers was determined by pulling the precured compound (Sample) away from the other rubber compound (substrate) at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during testing.

TABLE 1

|  | Substrate Rubber | | | |
|---|---|---|---|---|
|  | Sidewall | | Chafer | |
|  | Sample No. | | | |
|  | 5 | 6 | 5 | 6 |
| Buffed Adhesion, N | 203 | 132 | 217 | 93 |
| Buffed + Cemented Adhesion, N | 200 | 150 | 214 | 97 |

As seen in Table 1, in each case Sample 5 having the conventional polybutadiene showed superior adhesion to Sample 6 having the specialized polybutadiene. The use of the adhesive strip including a composition (of Sample 5) improves adhesion of the abrasion resistant coverstrip compound (of Sample 6) to the tube and sidewall of the tire.

What is claimed is:

1. A self-inflating tire comprising:

a tire having at least one of a sidewall and a chafer;

a groove positioned within the sidewall or chafer;

an air tube positioned within the groove in contacting engagement with opposite groove surfaces at least partially surrounding the air tube;

a coverstrip overlaying and sealing the groove, the coverstrip comprising a vulcanizable rubber composition comprising from 50 to 80 phr of a polybutadiene having a microstructure comprised of about 96 to about 99 percent cis 1,4-isomeric units, about 0.1 to about 1 percent trans 1,4-isomeric units and from about 1 to about 3 percent vinyl 1,2-isomeric units; a number average molecular weight (Mn) in a range of from about 75,000 to about 150,000 and a heterogeneity index (Mw/Mn) in a range of from about 3/1 to about 5/1;

from 20 to 50 phr of natural rubber;

from 0.1 to 5 parts by weight, per 100 parts by weight of rubber (phr), of a vulcanization modifier selected from the group consisting of N-nitroso diphenylamine, polynitroso-2,2,4-trimethyl-1,2-dihydroquinoline, N-cyclohexyl thiophthalimide, phthalic anhydride, salicylic acid, and benzoic acid;

an adhesive strip disposed between the coverstrip and the tube, the adhesive strip comprising a vulcanizable rubber composition comprising from 50 to 80 phr of a second polybutadiene having a heterogeneity index (Mw/Mn) in a range of from about 1.5/1 to 2.5/1;

from 20 to 50 phr of natural rubber;

from 0.1 to 0.2 phr of the vulcanization modifier; and a rubber adhesive surrounding the air tube.

* * * * *